United States Patent [19]
Kuntzburger et al.

[11] Patent Number: 5,976,349
[45] Date of Patent: Nov. 2, 1999

[54] PROCESS FOR THE REMOVAL OF METAL IMPURITIES BY AN ELECTROCHEMICAL ROUTE

[75] Inventors: Frederic Kuntzburger, Le Plessis-Bouchard; Jean-Claude Magne, La Courneuve, both of France

[73] Assignee: Rhodia Chimie, Courbevoie, France

[21] Appl. No.: 08/836,794

[22] PCT Filed: Nov. 21, 1995

[86] PCT No.: PCT/FR95/01530

§ 371 Date: Jul. 28, 1997

§ 102(e) Date: Jul. 28, 1997

[87] PCT Pub. No.: WO96/15984

PCT Pub. Date: May 30, 1996

[30] Foreign Application Priority Data

Nov. 21, 1994 [FR] France .................................... 94/14122

[51] Int. Cl.$^6$ ................................ C01D 1/40; C25C 7/02
[52] U.S. Cl. ........................ 205/750; 205/770; 205/771; 204/284; 204/294

[58] Field of Search ...................................... 205/750, 770, 205/771; 204/284, 294

[56] References Cited

U.S. PATENT DOCUMENTS 5,092,974  3/1992  Kondo et al. .......................... 204/518

Primary Examiner—Arun S. Phasge
Attorney, Agent, or Firm—Jean-Louis Seugnet

[57] ABSTRACT

A method for electrochemically purifying solutions with a pH higher than 14 to reduce metal impurities to the level of traces. The method comprises processing the solutions in an electrolytic cell in which the cathode has a fibrous web produced from a mixture of fibres including at least one fraction consisting of electrically conductive fibres and a binder selected from fluoropolymers, said fibrous web being deposited on an electrically conductive porous support. Said cathode may also be combined with a diaphragm or a membrane. A cathode having a fibrous web produced from a mixture of carbon fibres, cellulose compounds, and a cationic polymer such as cationic starch is also disclosed.

18 Claims, No Drawings

PROCESS FOR THE REMOVAL OF METAL IMPURITIES BY AN ELECTROCHEMICAL ROUTE

The present invention relates to a process for the purification of solutions the pH of which is higher than 14, by an electrochemical route, with the aim of reducing the metal impurities to trace form.

In particular, the process according to the invention is suitable for the purification of alkali metal hydroxide solutions the pH of which is higher than 14.

Furthermore, the present invention relates to a particular cathode capable of being applied in the process according to the invention.

Electrochemical methods for obtaining solutions the pH of which is higher than 14, and more particularly of alkali metal hydroxide solutions, are now well known and developed industrially.

Electrolysis in diaphragm cells may be mentioned among the electrochemical methods for obtaining these solutions. Similarly, electrolysis in mercury cells is known. This process consists, in a first step, in producing an amalgam of sodium and mercury from a solution saturated with sodium chloride and then, in a second step, in reacting the said amalgam with water to give sodium hydroxide. Finally, electrolysis in a membrane cell may be mentioned, in which the anode and cathode compartments do not communicate.

These two last methods make it possible to produce alkali metal hydroxide solutions containing relatively few metal impurities. In fact, in contrast to the diaphragm cells, there is practically no corrosion due to the reaction medium in the electrolyser itself. In the case of mercury cells the problem of anode and cathode corrosion does not arise because the anode happens to be mercury and the cathode graphite or vice versa, according to the cell compartment. In the case of membrane cells it must be noted that the materials of construction of membrane cells are much more resistant than those usually employed for diaphragm cells: the membrane is very brittle and must therefore be contaminated as little as possible with metals produced by the corrosion of the cell materials, failing which the cell performance is considerably reduced. Finally, the subsequent stages of concentration of the soda are lesser in the case of the mercury and membrane cells than in that of the diaphragm cells, because the soda obtained is more concentrated. This decreases proportionately the risks of corrosion of the equipment employed for the said concentration.

Thus, the alkali metal hydroxide solution produced in diaphragm cells is found to be contaminated by the presence of metallic elements originating from the electrodes and also from the equipment used during the concentration stage. These metals are encountered in a quantity of the order of a few parts per million, a content that is higher than that of alkali metal hydroxide solutions originating from the other two types of cells which have been mentioned.

It is therefore necessary to have available solutions the pH of which is higher than 14, and more particularly alkali metal hydroxide solutions, which have a degree of purity with regard to these metals that is comparable with the hydroxide solutions obtained by electrolysis in mercury and membrane cells.

Furthermore, it is necessary to perform a purification of such solutions by using methods which are simple and economical.

Methods for electrochemical purification of alkali metal hydroxide solutions do exist. They usually employ vessels including, as cathode, hollow graphite cylinders the porosity of which is controlled. The disadvantage of a process of this type lies in the manufacture of these cylinders and in the fact that the equipment is large in bulk. In fact, the cross-section of the electrode is 5 $m^2/m^3$ of electrode working volume.

The subject-matter of the present invention is therefore a process for the purification of solutions the pH of which is higher than 14 which does not exhibit the abovementioned disadvantages.

Thus, the process according to the invention consists in treating solutions the pH of which is higher than 14 in an electrolysis cell in which the cathode includes a fibrous sheet based on a mixture of fibres at least a proportion of which is electrically conductive and of a binder chosen from fluoropolymers, the said fibrous sheet being deposited on an electrically conductive porous support.

The solutions which can be treated according to the process of the invention are more particularly alkali metal hydroxide solutions which have a concentration of 40 to 800 g of alkali metal hydroxide per litre of solution.

The method according to the invention makes it possible to obtain solutions which have metal impurity contents lower than 1 mg/kg, or even as low as 0.01 mg/kg.

One of the advantages of the process according to the invention is that the bulk of the vessels is up to 4 to 5 times smaller than that entailed by the abovementioned purification processes. In addition, the regeneration of the cathodes used is very simple and effective.

Moreover, these cathodes are highly resistant despite the very high pH values of the solution to be treated.

However, other characteristics and advantages will be seen more clearly on reading the description and the examples which are to follow.

Thus, the process according to the invention is used in an electrolysis cell the cathode of which includes a fibrous sheet consolidated with a fluoropolymer and deposited on an electrically conductive support.

The fibrous sheet of the cathode, also called electrically conductive microporous material, conducts electricity. More particularly, it has an electrical resistivity of between 0.5 and 15 $\Omega$cm.

The fibrous sheet is obtained from a mixture of fibres in which at least a fraction of the fibres is electrically conductive, optionally in combination with nonconductive fibres.

The electrically conductive fibres may thus be fibres which are intrinsically conductive or else treated so as to make them such.

According to a particular embodiment of the invention, intrinsically conductive fibres are employed such as, especially, carbon or graphite fibres.

More particularly, these fibres are in the form of filaments the diameter of which is generally smaller than 1 mm and more particularly between $10^{-3}$ and 0.1 mm and the length of which is greater than 0.5 mm and more especially between 1 and 20 mm.

Furthermore, the conductive fibres preferably have a monodisperse length distribution, that is to say a distribution such that the length of at least 80% and advantageously of at least 90% of the fibres corresponds to the mean length to within ±10%.

Among the nonconductive fibres which are optionally employed, two categories may be recognized: organic fibres and inorganic fibres.

A first class of organic fibres is constituted by polypropylene and polyethylene fibres or among fluoropolymer fibres.

"Fluoropolymers" is intended to mean homopolymers or copolymers derived at least partly from olefin monomers substituted with fluorine atoms or substituted with a combination of atoms of fluorine and of at least one of the atoms of chlorine, bromine or iodine, per monomer.

Examples of fluoro homopolymers or copolymers may consist of polymers and copolymers derived from tetrafluoroethylene, hexafluoropropylene, chlorotrifluoroethylene or bromotrifluoroethylene.

Such polymers may also include up to 75 mol % of units derived from other ethylenically unsaturated monomers containing at least as many fluorine atoms as carbon atoms, like, for example, vinylidene (di)fluoride and vinyl and perfluoroalkyl esters such as perfluoroalkoxyethylene.

Organic fibres made of polytetrafluoroethylene (called PTFE fibres in what follows) are preferably employed.

The organic fibres, and more particularly the PTFE fibres, generally have a diameter of 10 to 500 $\mu$m and a length such that the ratio of the length to the diameter is between 5 and 500. organic fibres whose mean dimensions are between 5 and 200 $\mu$m in the case of the diameter and between 1 and 10 mm in the case of the length are preferably used.

A second category of organic fibres consists of compounds based on cellulose fibres. Such compounds are preferably employed with a cationic polymer such as cationic starch. Such compounds may thus be pretreated with this cationic polymer or else this polymer may be added to the mixture of fibres independently of the compounds based on cellulose fibres. Fibres to which a positive ionic charge has been given, especially by treating these fibres with a cationic polymer or starch may be employed. It is also possible to employ fibres with a positive surface charge, marketed by the Beco company under the name Becofloc®.

The fibres of the first category may, of course, be employed in combination with the fibres of the second category. In particular, PTFE fibres may be employed in combination with the abovementioned cellulose-based compounds.

The inorganic fibres are chosen from ceramic fibres like zirconium dioxide, silicon carbide and boron nitride fibres or else titanate fibres or titanium suboxide fibres of general chemical formula $Ti_nO_{2n-1}$ with n, an integer, between 4 and 10 (of the Ebonex® type, which are manufactured and marketed by the Atraverda company).

The mixture of fibres additionally includes a fluoropolymer consolidating all the fibres. The definition given above for polymers of this type remains valid in this case and therefore will not be repeated here.

This fluoropolymer, or binder, is more particularly in the form of an aqueous dispersion containing 30 to 80% by weight of dry polymer, the particle size of which is between 0.1 and 5 $\mu$m and preferably between 0.1 and 1 $\mu$m.

According to a particular embodiment of the invention the fluoropolymer is polytetrafluoroethylene.

It should be noted, furthermore, that the mixture from which the fibrous sheet is obtained may include other additives such as, especially, pore-forming or thickening agents and surfactants.

Insofar as the pore-forming agents are concerned, any compounds are suitable, as long as they can be removed, for example by leaching or by thermal decomposition. However, silica-based derivatives are preferably employed. These compounds are particularly advantageous because they practically do not disintegrate the electrically conductive microporous material and form networks with the polymer binding the fibres when the latter is employed in the form of a latex.

"Silica-based derivatives" is intended, according to the invention, to mean precipitated silicas and combustion or pyrogenic silicas. They have more particularly a BET specific surface of between 100 $m^2/g$ and 300 $m^2/g$ and/or a particle size, evaluated with a Coulter® counter, of between 1 and 50 $\mu$m and preferably between 1 and 15 $\mu$m.

As surfactant, nonionic compounds are more particularly employed, such as ethoxylated alcohols or fluorocarbon compounds containing functionalized groups, which generally have carbon chains containing 6 to 20 carbon atoms. Ethoxylated alcohols chosen from ethoxylated alkylphenols, such as especially octoxynols, are preferably employed.

Thickening agents are intended to mean compounds capable of increasing the viscosity of the mixture of fibres and which have water-retaining properties. Natural or synthetic polysaccharides are generally employed. Special mention may be made of the biopolymers obtained by fermentation of a carbohydrate under the effect of microorganisms, such as xanthan gum or any other polysaccharide exhibiting similar properties.

As already indicated earlier, the electrically conductive material is deposited on a porous support. Cloths or grids whose mesh gap, perforations or porosity may be between 20 $\mu$m and 5 mm are especially suited. These porous supports may have one or a number of planar or cylindrical surfaces, commonly called a "thimble", which have an open surface.

The cathode employed in the process according to the invention, that is corresponding to the porous support and fibrous sheet unit, has a large specific surface, needed to obtain good results (the cross-section of the electrode is of the order to 20 to 50 $m^2/m^3$ of electrode working volume), while being of relatively small bulk. This presents an undoubted advantage in the case of an industrial exploitation.

A particular cathode, which also forms a subject-matter of the present invention, is employed in the process according to the invention.

This cathode includes a fibrous sheet obtained from a mixture of carbon fibres, compounds based on cellulose fibres and a cationic polymer such as cationic starch.

The cathode according to the invention may similarly include a fibrous sheet obtained from a mixture of carbon fibres and of compounds based on cellulose fibres pretreated with a cationic polymer such as cationic starch.

Moreover, the mixture of fibres preferably includes a pore-forming agent such as silica, as well as a surfactant.

According to a highly advantageous alternative form of the invention the fibrous sheet deposited on the electrically conductive porous support is used in combination with a microporous diaphragm.

According to a first embodiment of this alternative form the diaphragm is deposited on the fibrous sheet especially according to a process of preparation as described in what follows.

Such diaphragms generally consist of a fibrous sheet including a mixture of organic and inorganic fibres with a fluoropolymer binding these fibres.

Organic fibres which may be mentioned are polyethylene, polypropylene or fluoropolymer fibres, as well as cellulose-based fibres.

Inorganic fibres which may be employed are especially carbon, graphite, ceramic, titanate and titanium suboxide fibres.

All that has been mentioned previously concerning the abovementioned fibres, as well as the additives which are suitable for the preparation of the fibrous sheet, remains valid insofar as the diaphragm is concerned and consequently will not be repeated here.

The diaphragm used in combination includes a mixture of organic fibres and of inorganic fibres which are preferably chosen from carbon, graphite and titanate fibres.

According to a second embodiment of this alternative form the diaphragm is not deposited on the fibrous sheet but is arranged separately so as to separate the anode and cathode compartments.

Such diaphragms are commercially available and are based especially on fibres of the ceramic type or Teflon.

According to a second alternative form of the invention the cathode, including the fibrous sheet deposited on an electrically conductive support, is used in combination with a membrane.

Examples of membranes suitable for the process according to the invention which may be mentioned are perfluorosulphonic membranes of the Nafion type (marketed by the Du Pont company), or else perfluoro membranes including carboxylic functional groups (Fx-50 or 890 series, marketed by the Asahi Glass company). In addition, it is possible to employ two-layer membranes including sulphonics groups on one face and carboxylic groups on the other.

A method of preparation of the cathode used will now be described.

The cathode according to the invention can thus be obtained by a wet route, by depositing, under programmed vacuum, a suspension including the constituent elements of the fibrous sheet, through a porous support.

More particularly the process of preparation of the cathode consists in performing the following stages:

[a] an aqueous suspension is prepared including a mixture of fibres in which at least a fraction consists of electrically conductive fibres, a binder chosen from fluoropolymers, a pore-forming agent and, if appropriate, additives;

[b] the said suspension is deposited onto a porous support by filtration under a programmed vacuum;

[c] the sheet thus obtained is drained and optionally dried;

[d] the resulting unit is sintered at a temperature which is higher than or equal to the melting or softening temperature of the binder,

[e] the pore-forming agent is removed by a treatment performed before or during the use of the cathode.

As mentioned above, the first stage of the process consists in preparing a suspension including the constituent components of the fibrous sheet.

According to a particular embodiment of the invention the suspension includes a mixture of 20 to 80 parts by dry weight of conductive fibres, preferably from 20 to 40, and from 20 to 100 parts by dry weight of organic nonconductive fibres.

0 to 50 parts by dry weight of cationic polymer, such as cationic starch, may be employed.

The suspension may additionally include 10 to 100 parts by dry weight of inorganic nonconductive fibres. More particularly, the suspension may include 20 to 60 parts by dry weight of nonconductive inorganic fibres.

The nonconductive inorganic fibres are more particularly chosen from titanate fibres.

The content of fluoropolymer binding the fibres is generally between 10 and 60 parts by dry weight.

The suspension used in the process according to the invention usually includes from 30 to 200 parts by dry weight of at least one pore-forming agent. According to a particular method the content of pore-forming agent is from 30 to 100 parts by dry weight.

The content of thickening agent generally varies between 0 and 30 parts by dry weight. More particularly, it is from 0 to 10 parts by dry weight.

Finally, the suspension in most cases includes not more than 10 parts by dry weight of at least one surfactant, and more particularly a content of between 0.5 and 5 parts by dry weight.

According to the process for preparing the cathode, the fibrous sheet is formed by filtration of the said suspension through a porous support under programmed vacuum.

This porous support may or may not conduct electricity. If the second case is applicable, then before the sintering stage [d] the sheet is separated from the nonconductive porous support and is applied onto a conductive porous support before the whole is sintered.

According to a preferred alternative form the vacuum filtration of the suspension obtained in stage [a] is performed directly through the conductive porous support.

The sheet is deposited on the porous support by filtration under programmed vacuum. The latter is produced in a manner which is known per se and may be produced continuously or stepwise, to a final partial vacuum of $1.5 \times 10^3$ to $4 \times 10^4$ Pa.

Once the sheet is deposited, it is drained by maintaining the vacuum for a few moments and then optionally dried in air at a temperature between the ambient temperature and 150° C.

The sheet is then sintered by heating to a temperature higher than or equal to the melting temperature of the fluoropolymer. During this sintering stage a proportion of the constituents of the mixture from which the fibrous sheet is formed is generally degraded thermally.

A stage of removal of the pore-forming agent is performed next, especially by means of an aqueous solution of alkali metal hydroxide.

It should be noted that the removal of the pore-forming agent may be done not only before the use of the electrically conductive microporous material, but also in situ, that is to say during the first moments of the use of the cathode. However, given the objective for which the latter is employed, it may be preferable to avoid contaminating the solution to be purified with the pore-forming agent dissolved during this stage.

In the case where the cathode employed in the process according to the invention includes an associated diaphragm, in the sense that the diaphragm is deposited on the fibrous sheet, the following stages are performed:

[a] an aqueous suspension is prepared including a mixture of fibres at least a fraction of which consists of electrically conductive fibres, a binder chosen from fluoropolymers, a pore-forming agent and, if appropriate, additives;

[b] the said suspension is deposited on a porous support by filtration under programmed vacuum;

[c] the sheet thus obtained is drained and optionally dried;

[d] the said sheet is optionally sintered at a temperature higher than or equal to the melting or softening temperature of the binder;

[e] the pore-forming agent is optionally removed;

[f] an aqueous dispersion including at least a mixture of organic and inorganic fibres, a binder, a pore-forming agent and, if appropriate, additives, is filtered on the resulting sheet;

[g] the unit thus formed is drained and optionally dried;

[h] the unit is sintered at a temperature higher than or equal to the melting or softening temperature of the binder;

[i] the pore-forming agent is removed by a treatment performed before the use of the cathode or when the latter is used.

All that has been said above concerning the stages [a] to [e] remains valid and will not be repeated in this part.

The dispersion prepared in stage [f] therefore includes a mixture of organic and inorganic fibres.

Titanate fibres, carbon or graphite fibres or a mixture thereof, are employed as inorganic fibres. In is the case where carbon or graphite fibres are employed the content is more particularly at least 2% by weight of the diaphragm. The carbon or graphite fibre content preferably does not represent more than 10% by weight of the diaphragm. Polytetrafluoroethylene fibres are employed as organic fibres according to a more particular embodiment.

According to a particular embodiment the dispersion includes a mixture of inorganic and organic fibres the content of which is between 30 and 80% by weight. In this mixture the proportion of inorganic fibres represents 1 to 80% by weight of the fibre mixture.

The dispersion in stage [f] additionally includes a binder, the quantity of which may vary between 3 and 35% by weight.

The dispersion includes a pore-forming agent the quantity of which is more particularly between 5 and 40% by weight.

Finally, the dispersion may include additives such as surfactants and thickening agents, in a proportion which generally varies between 0 and 5% by weight.

It should be noted that the sintering stage described in stage [d] is not compulsory, as long as the binder forming part of the composition of each of the two sheets is identical or has a melting temperature of the same order of magnitude. In this case, in fact, the sintering of the combination of the two sheets may be advantageously carried out after the deposition of the diaphragm.

The solutions to be purified according to the process of the invention have a pH higher than 14. The process according to the invention is especially appropriate for the purification of alkali metal hydroxide solutions.

In this case the solution to be treated is preferably obtained by electrolysis of a solution of a corresponding alkali metal halide. More particularly, the invention is advantageous for the purification of solutions originating from the electrolysis performed in a diaphragm cell.

It should be noted, furthermore, that it would not constitute a departure from the scope of the present invention to purify a solution of an alkali metal hydroxide resulting from another method of preparation, provided that the problem due to the presence of metals arises in similar terms.

According to a preferred method of the invention the solution to be treated is a sodium hydroxide solution.

The metals liable to be present in the hydroxide solutions to be purified are usually chosen from iron, nickel, aluminium, chromium, vanadium, arsenic, selenium, lead, cadmium, manganese and copper. This list is, of course, not meant to be exhaustive.

As a general rule, the content of metals in the solution to be treated is not more than a few hundred milligrams per kilogram of solution.

The process according to the invention may be employed for purifying solutions whose alkali metal hydroxide content is from 30 to 50% by weight, although contents outside these are not excluded.

In the particular case where the alkali metal hydroxide solutions are obtained by electrolysis as stated above, a pretreatment of the solution is preferably performed before the purification process is applied.

Thus, the solution leaving the electrolysis cell, consisting of a mixture of alkali metal hydroxide and of starting halide, is concentrated and the precipitated halide salt is separated from the solution. This operation takes place according to methods which are known to a person skilled in the art, for example by means of evaporators. According to an alternative form, once the concentration has been carried out, desalting of the resulting solution is performed, especially by reaction with aqueous ammonia.

The solution to be treated is next introduced into an electrolysis cell including the cathode described above and an anode. The latter is usually made of nickel, nickel oxide or else of stainless steel.

The cathode may be found equally well upstream or downstream of the anode. In the former case, two systems of application in the case of the cell are particularly suitable, the thimble cells, or the cassette cells. With regard to this latter type of cell, the cathode has a planar shape.

If the cathode is used in combination with a diaphragm which is not obtained by deposition of the latter on the cathode sheet, an alternative form of the process according to the invention consists in employing a commercial diaphragm like, for example, a diaphragm based on ceramic fibres or on Teflon. In this case the diaphragm is fitted in the cell downstream or upstream of the anode.

The flow rates of solutions to be purified vary over a wide range and depend on the quantity of solution to be purified and the capacity of the electrolysis cell for treating the latter.

The currents applied are generally lower than 2000 A/m$^2$.

The duration of the purification cycle is advantageously of the order of 500 to 1000 hours.

The cathodes employed in the process of the invention can be regenerated by any known means. Such a regeneration may, in fact, be necessary because during the treatment the contaminating metals precipitate on the cathode, and this can entail a change in the permeability of the latter. Accordingly, when the pressure needed to obtain the same flow rate becomes too high, it is generally necessary to regenerate the cathode to make it reusable.

This regeneration may be carried out electrochemically. Thus, by reversing the polarity of the electrodes or by lowering the value of the voltage at the cathode, redissolving of the contaminating metals can be produced. The chemical method may similarly be employed, that is to say employing an acid of the hydrochloric, sulphuric or nitric type or else a base such as sodium hydroxide.

Thus purified, the solution has a content of metal impurities of not more than 1 mg/kg and they may be as low as 0.01 mg/kg. Thus, and more especially in the case of alkali metal hydroxide solutions, the solutions obtained become suitable for subsequent uses such as the preparation of sodium hypochlorite, in the case of which the colour of the iron was not desired. Similarly, the solutions obtained can be employed in foodstuff applications, as for the preparation of phosphates.

However, other advantages and characteristics will become apparent on reading the nonlimiting examples of the invention which are to follow.

EXAMPLES

In what follows, the electrolysis cell has the following characteristics:

Anode: expanded nickel,

Porous support of the cathode: stainless steel composed of 2-mm wires and 2-mm meshes, Cell assembled according to the filter press type, Cross-section of the cathode active surface: 10 cm$^2$.

Example 1

1/ Preparation of the Cathode

A suspension is prepared with stirring from the following compounds:

- demineralized water, the quantity of which is calculated in order to obtain approximately 4 litres of suspension and a solids content of approximately 4.8% by weight,
- 30 g of PTFE fibres introduced in the form of a mixture of sodium chloride and of PTFE fibres (50/50 by weight).

These sodium chloride-impregnated PTFE fibres are obtained beforehand by mixing a litre of water, with stirring, with approximately 100 g of a mixture containing approximately 50% of PTFE fibres and 50% of NaCl,

- 70 g of carbon fibres (mean length 1.5 mm, diameter approximately 10 $\mu$m),
- 15 g of PTFE in the form of latex with a solids content of approximately 65% by weight,
- 100 g of precipitated silica (Rhône-Poulenc Tixosil®, BET surface 250 m$^2$/g),
- 9 g of xanthan gum.

The mixture thus obtained is deposited by filtration on a porous support of 10 cm$^2$ consisting of a braided and rolled iron mesh the opening of which is 2 mm and the wire diameter 2 mm. The filtration is conducted under vacuum programmed as follows:

- 1000 Pa min$^{-1}$ for 10 min,
- 5000 Pa min$^{-1}$ to reach a final partial vacuum of 25 000 Pa.

The whole is then dried for 12 hours at 100° C. the weight deposited is 0.45 kg/m$^2$.

A second suspension is prepared, including:

- 100 g of PTFE fibres introduced in the form of 200 g of a mixture of fibres and of sodium chloride (50/50 by weight) treated as described above,
- 20 g of potassium titanate fibres (diameter between 0.2 and 0.5 $\mu$m, length from 10 to 20 $\mu$m),
- 20 g of PTFE in the form of latex with a solids content of approximately 65% by weight,
- 30 g of precipitated silica (Rhône-Poulenc Tixosil®, BET surface: 250 m$^2$/g),
- 3.6 g of Triton (Rohm and Haas),
- 5 g of carbon fibres (length: 1.5 mm, diameter: 10 $\mu$m).

The suspension is stirred for 30 min and then after standing for 48 hours the suspension is stirred again and filtered on 1 dm$^2$ of dried precathode sheet obtained previously.

The filtration is conducted under programmed vacuum of 5000 Pa min$^{-1}$, to reach 80 000 Pa.

The composite thus obtained is dried for 12 hours at 100° C. and consolidated by melting the fluoropolymer at 350° C. for 7 min.

The weight deposited in the case of this second sheet is 1.5 kg/m$^2$.

2/ Cycles of Soda Purification/Cathode Regeneration

The effluent treated is soda at a concentration of 50% desalinated by a treatment with aqueous ammonia. The temperature of the treatment for purifying the soda is 50° C. The solution to be treated is introduced into the anode compartment of the cell before percolating through the cathode obtained in section 1/.

In this case the configuration is such that the anode is upstream of the cathode.

The electrode is regenerated when the hydraulic head becomes too high to impose a given treatment flow rate. The regeneration is not necessarily complete and corresponds to the dissolving of the metal species deposited. It is performed by percolation of 50% soda at 80° C. for approximately 24 hours with a flow rate varying between 150 l/h m$^2$ and 1000 l/h m$^2$ at the end of the regeneration.

At the end of this stage the cathode component thus regenerated is employed.

The results are listed together in the table below, in which:

- the time (hours) represents the duration of the purification cycle,
- the current (mA) corresponds to the current applied in order to maintain the effectiveness of the purification treatment (exit metal content),
- the voltage (V) corresponds to the voltage measured at the electrode,
- the hydraulic head is expressed in cm of 50% soda,
- the flow rate treated is expressed in l/h m$^2$,
- the iron and nickel contents are expressed in mg/kg of solution.

| time | current | voltage | load | flow rate | iron content entry | iron content exit | nickel content entry | nickel content exit |
|---|---|---|---|---|---|---|---|---|
| 0 | 300 | 2.2 | 18 |  | 11 | 11 | 0.6 |  |
| 70 | 300 | 2.1 | 17 | 280 | 11 | 0.4 | 0.6 | <0.05 |
| 200 | 300 | 2.0 | 31 | 340 | 11 | 0.3 | 0.6 | <0.05 |
| 600 | 500 | 2.2 | 46 | 170 | 11 | 0.3 | 0.6 | <0.05 |

It is found that at the end of a purification cycle the current must be increased in order to preserve the effectiveness, because of the increase in the quantity of metal deposited in the electrode.

CYCLE 2 after regeneration

| time | current | voltage | load | flow rate | iron content entry | iron content exit | nickel content entry | nickel content exit |
|---|---|---|---|---|---|---|---|---|
| 0 | 300 | 2.0 | 33 |  | 12 |  | 0.6 |  |
| 100 | 300 | 2.0 | 35 | 200 | 12 | 0.7 | 0.6 | <0.05 |
| 200 | 300 | 2.0 | 47 | 200 | 12 | 0.7 | 0.6 | <0.05 |
| 300 | 300 | 1.9 | 47 | 190 | 12 | 0.7 | 0.6 | <0.05 |
| 500 | 500 | 2.1 | 54 | 170 | 12 | 0.7 | 0.6 | <0.05 |

CYCLE 3 after regeneration

| time | current | voltage | load | flow rate | iron content entry | iron content exit | nickel content entry | nickel content exit |
|---|---|---|---|---|---|---|---|---|
| 0 | 300 | 1.9 | 33 |  | 12 |  | 0.6 |  |
| 100 | 300 | 2.0 | 35 | 155 | 12 | 0.5 | 0.6 | <0.05 |
| 150 | 300 | 2.0 | 46 | 190 | 12 | 0.5 | 0.6 | <0.05 |
| 200 | 300 | 2.0 | 46 | 170 | 12 | 0.45 | 0.6 | <0.05 |
| 260 | 330 | 2.0 | 46 | 150 | 12 | 0.54 | 0.6 | <0.05 |
| 300 | 330 | 2.0 | 56 | 150 | 12 | 0.6 | 0.6 | <0.05 |

It is found that the electrode can be regenerated and can retain its purification capacity.

Example 2

1/ Preparation of the Cathode Component The procedure is as in the preceding example, except for the fact that the first suspension has the following composition:

- 30 g of PTFE fibres pretreated as shown in Example 1, 70 g of carbon fibres,
15 g of PTFE in the form of latex,
50 g of precipitated silica,
9 g of xanthan gum.

The second suspension has the following composition:
100 g of PTFE fibres pretreated as shown in Example 1,
5 g of carbon fibres,
20 g of PTFE in the form of latex,
30 g of precipitated silica,
3.6 g of Triton X100.

2/ Purification of the Soda

The effluent treated is soda at a concentration of 50% previously desalinated as shown in Example 1.

The treatment is carried out at a temperature of 50° C. The results obtained are listed together in the table below:

| time | current | voltage | load | flow rate | iron content entry | iron content exit | nickel content entry | nickel content exit |
|---|---|---|---|---|---|---|---|---|
| 0 | 150 | 2.4 | 20 | — | 11 | 11 | 0.6 | |
| 150 | 200 | 2.6 | 20 | 195 | 11 | 1 | 0.6 | <0.05 |
| 200 | 300 | 2.9 | 20 | 185 | 11 | 0.5 | 0.6 | <0.05 |
| 500 | 300 | 2.8 | 33 | 210 | 11 | 0.3 | 0.6 | <0.05 |
| 700 | 300 | 2.8 | 34 | 220 | 11 | 0.5 | 0.6 | <0.05 |
| 850 | 300 | 2.8 | 56 | 200 | 11 | 0.5 | 0.6 | <0.05 |
| 1000 | 300 | 2.8 | 56 | 200 | 11 | 0.5 | 0.6 | <0.05 |

What is claimed is:

1. A process for the purification of a solution having a pH higher than 14 in order to remove the metal impurities therefrom, comprising the following steps:
   (1) treating the solution in an electrolysis cell wherein the cathode includes a fibrous sheet obtained from a mixture of fibers in which at least a fraction of said fibers consists of electrically conductive fibers and of a fluoropolymer binder, said fibrous sheet being deposited on an electrically conductive porous support, and
   (2) recovering the purified solution.

2. A process according to claim 1, wherein the solution is a solution of alkali metal hydroxide.

3. A process according to claim 2, wherein the alkali metal hydroxide solution has a concentration of 40 to 800 g of alkali metal hydroxide per liter of solution.

4. A process according to claim 3, wherein said solution is an aqueous solution.

5. A process according to claim 1, wherein the cathode further comprises a diaphragm.

6. A process for the preparation of a cathode of an electrolysis cell useful for the purification of a solution having a pH higher than 14 in order to remove the metal impurities therefrom, said process comprising the steps of:
   [a] preparing an aqueous suspension comprising a mixture of fibers, at least a fraction of said fibers being electrically conductive fibers, a fluoropolymer binder, a pore-forming agent and, optionally, additives;
   [b] depositing said suspension onto a porous support by filtration under programmed vacuum in order to obtain a sheet;
   [c] draining and optionally drying said sheet;
   [d] sintering said sheet at a temperature higher than or equal to the melting or softening temperature of the binder; and
   [e] removing the pore-forming agent before the use of the cathode or when the cathode is used.

7. A process according to claim 6, wherein the solution to be purified is an alkali metal hydroxide solution having a concentration of 40 to 800 g of alkali metal hydroxide per liter of solution.

8. A process according to claim 7, wherein said solution is an aqueous solution.

9. A process for the preparation of a cathode of an electrolysis cell useful for the purification of a solution having a pH higher than 14 in order to remove the metal impurities therefrom, said process comprising the steps of:
   [a] preparing an aqueous suspension comprising a mixture of organic and inorganic fibers, at least a fraction of said fibers being electrically conductive fibers, a fluoropolymer binder, a pore-forming agent and additives;
   [b] depositing said suspension onto a porous support by filtration under programmed vacuum to obtain a sheet;
   [c] draining and drying said sheet;
   [d] optionally, sintering said sheet at a temperature higher than or equal to the melting or softening temperature of the binder;
   [e] optionally, removing the pore-forming agent;
   [f] depositing on the sheet thus formed an aqueous dispersion including a mixture of the organic and inorganic fibers, the fluoropolymer binder, the pore-forming agent and, optionally, the additives to obtain a unit;
   [g] drying and draining said unit;
   [h] sintering said unit at a temperature higher than or equal to the melting or softening temperature of the binder; and
   [i] removing the pore-forming agent before the use of the cathode or when the cathode is used.

10. A process according to claim 9, wherein the solution to be purified is an alkali metal hydroxide solution having a concentration of 40 to 800 g of alkali metal hydroxide per liter of solution.

11. A process according to claim 10, wherein said solution is an aqueous solution.

12. A cathode of an electrolysis cell useful for the purification of a solution having a pH higher than 14 in order to remove the metal impurities therefrom, comprising a fibrous sheet obtained from a mixture of carbon fibers, of compounds based on cellulose fibers, and of a cationic polymer.

13. A cathode according to claim 12, wherein the fibrous sheet is obtained from a mixture of carbon fibers and of compounds based on cellulose fibers pretreated with a cationic polymer.

14. A cathode according to claim 13, wherein the cationic polymer is cationic starch.

15. A cathode according to claim 14, wherein the mixture of fibers further comprises a pore-forming agent and a surfactant.

16. A cathode according to claim 12, wherein the cationic polymer is cationic starch.

17. A cathode according to claim 12, wherein the mixture of fibers further comprises a pore-forming agent and a surfactant.

18. A cathode according to claim 12, further comprising a diaphragm or a membrane.

* * * * *